United States Patent [19]
Green et al.

[11] 4,128,130
[45] Dec. 5, 1978

[54] TOOL SUPPORT

[75] Inventors: Robert V. Green; Jack C. Wiley, both of Davenport, Iowa; Loren G. Arnold, Rock Island, Ill.

[73] Assignee: Deere & Company, Moline, Ill.

[21] Appl. No.: 729,504

[22] Filed: Oct. 1, 1976

[51] Int. Cl.$^2$ ............................................. A01B 61/04
[52] U.S. Cl. ...................................... 172/266; 172/705
[58] Field of Search ............... 172/264, 265, 266, 267, 172/268, 705

[56] References Cited

U.S. PATENT DOCUMENTS

| | | | |
|---|---|---|---|
| 1,219,342 | 3/1917 | Myers | 172/264 |
| 3,321,027 | 5/1967 | Johnson | 172/266 |
| 3,486,566 | 12/1969 | Nja | 172/265 |
| 3,565,180 | 2/1971 | Arnold | 172/265 |
| 3,599,728 | 8/1971 | Moe | 172/265 |
| 3,965,989 | 6/1976 | Ward | 172/310 |
| 3,976,144 | 8/1976 | Ralston | 172/267 |

FOREIGN PATENT DOCUMENTS

| | | | |
|---|---|---|---|
| 635406 | 1/1962 | Canada | 172/265 |
| 304070 | 2/1918 | Fed. Rep. of Germany | 172/265 |

*Primary Examiner*—Richard J. Johnson

[57] ABSTRACT

An earthworking tool suspension system composed of a pair of vertically disposed and fore-and-aft extending four bar linkages in which the coupler link of the front linkage is the base link of the rear linkage, the tool standard has an upper part that is pivotally connected to the lower link of the front linkage and the coupler link of the second linkage, and the part serves as the lower link of the rear four bar linkage. A biasing means is provided and is connected to both four bar linkages. The front four bar linkage permits the tool to float vertically with little change in attitude. The two four bar linkages in series permit the tool to rotate and rise relative to the main frame of the implement, when the tool strikes an obstruction requiring such action.

42 Claims, 8 Drawing Figures

TOOL SUPPORT

BACKGROUND OF THE INVENTION

The present invention relates to groundworking farm implements having tools which trip as obstructions are encountered and automatically reset upon clearing the obstruction.

Groundworking implements having hydraulic or spring trip mechanisms for protecting tools from damage as obstructions are encountered are well known in the art. A typical implement is an automatic reset plow which includes a mechanism permitting the plow bottom to rotate and rise with respect to the main frame when resistance is encountered and, when the obstacle is passed, automatically resetting or restoring the groundworking tool or plow bottom to the operating position. Certain types of plows support the plow bottom and its standard for floating movement about a pivotal connection with the frame. This type of arrangement causes the angle of attack of the plow bottom to increase as it floats. In such an arrangement the plow floats or raises in an arc about its pivotal connection with the frame. Still other plow bottom support arrangements provide for hydraulically controlled trip mechanisms which permit tripping rotation of the bottom about its supporting pivot on the standard. (See for example, U.S. Pat. No. 3,565,180 to Arnold et al, issued Feb. 23, 1971. In this arrangement, the plow is able to float about its pivotal connection with the frame or alternately trip and rotate about its pivotal connection with the standard when obstacles are encountered. This design has met with commerical success and its a high quality trip mechanism. However, it is a comparatively expensive arrangement and does have the inherent problems associated with hydraulic systems such as leakage and plumbing problems.

SUMMARY OF THE INVENTION

There is herein provided an earthworking tool support means which permits floating movement of the tool without significant changes in its earth penetrating angle of attack, and there is further provided a biasing means in the form of a spring-loaded mechanism for yieldably resisting the vertical floating movement of the tool and the rotational movement of the tool about its pivotal connection with the standard, and for also restoring the tool to an earth penetrating configuration and then back to working position after it has been tripped.

Supporting the earthworking tool for generally vertical floating movement is a four bar linkage having two of its opposite links of approximately the same length. This linkage configuration ensures a nearly straight up and down floating movement of the plow bottom so that the tool angle of attack remains within the acceptable ground penetrating configuration as it floats. This four bar support linkage further aids in permitting the use of comparatively low force biasing or spring means as compared to that required for a single pivot support. Coupled with the four bar linkage is the spring means which acts to urge the four bar linkage down.

To resist pivotal rotation of the bottom about its supporting connection with the first four bar linkage, the spring means is also connected to the plow bottom through a second four bar linkage which has a common link with the first four bar linkage. This second four bar linkage includes toggle linkage coupled with the biasing means, which permits rotation of the bottom upon encountering forces which exceed a threshhold value, and which acts to urge the bottom back to its operational position after being tripped.

The second four bar linkage further provides a lever rigid with the tool to enable the spring to counteract the large forces encountered during earthworking operation. The toggle linkage enables the springs to yieldably resist the high obstruction forces when necessary, but immediately collapse and yield when those forces exceed a threshhold value.

With this novel biasing and tripping arrangement, the tool is able to float essentially vertically during operation in order to pass over, for example, the upper surfaces of obstacles such as embedded stones. The tool may, however, yieldably rotate or trip to clear blunt obstacles. Most importantly, however, the tool may also release from and clear obstacles that the tool point hooks under.

DESCRIPTION OF A PREFERRED EMBODIMENT

Figure 1:
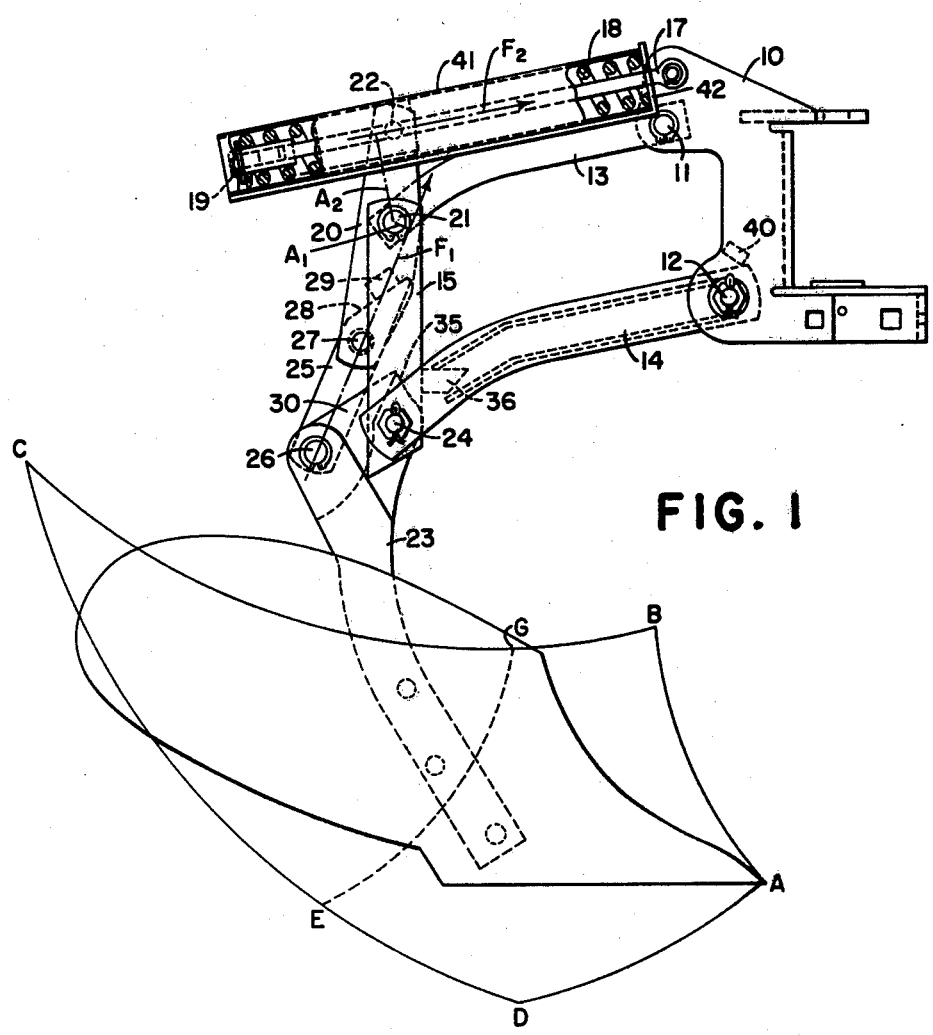
FIG. 1 is a side view of a plow bottom and its support or suspension mechanism utilized in mounting it on a plow frame.

FIG. 1 illustrates the implement or plow in its operating configuration.

The plow has a C-shaped frame member 10 constructed so as to clamp to a conventional plow frame not shown.

Pivotally connected to the frame 10 is the four bar linkage with one link thereof being the vertically disposed rear portion of the frame member 10. Upper and lower pivots 11 and 12 support the other three rigid links 13, 14 and 15 for movement through a vertical plane between a lowered and raised position. The link 10 and coupler link 15 are of approximate equal length and generally parallel. Floating movement of the pivotal connection supporting the standard and tool is generally vertical in nature. In this way the angle of attack of the plow bottom is substantially the same as it floats over obstacles in the ground and returns to a full down working position or depth.

Figure 2:
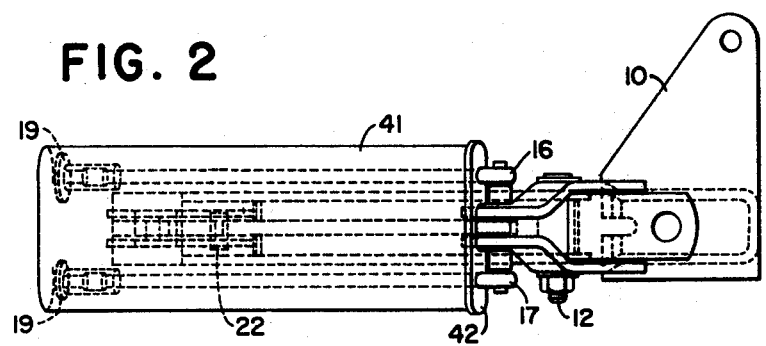
FIG. 2 is a plan view of the suspension mechanism shown in FIG. 1.

Yieldably urging the four bar linkage means toward its lowered position and illustrated in FIGS. 1 and 2 is the biasing means pivotally carried by the support frame 10. The biasing means includes a pair of transversely spaced horizontally disposed springs, such as at 18, mounted on separate and parallel eye bolts 16 and 17 which in turn are pivotally secured by respective pins to the support frame member 10 for swinging vertical movement. As is best illustrated in FIG. 2, each eye bolt has a nut 19 including a washer-type enlarged surface secured to the rear end thereof. A spring 18 surrounds each eye bolt and has one of its ends abutting the flat washer portion of the nut 19. A C-shaped elongated can structure 41 encloses the springs 18 and helps to maintain alignment. Secured to the forward end of the can 41 is an upstanding plate member 42 having the openings through which the eye bolts slidably pass. It is between the surface of washer 19 and this flat plate member 42 of the can which the opposite ends of the springs 18 abut.

Figure 7:
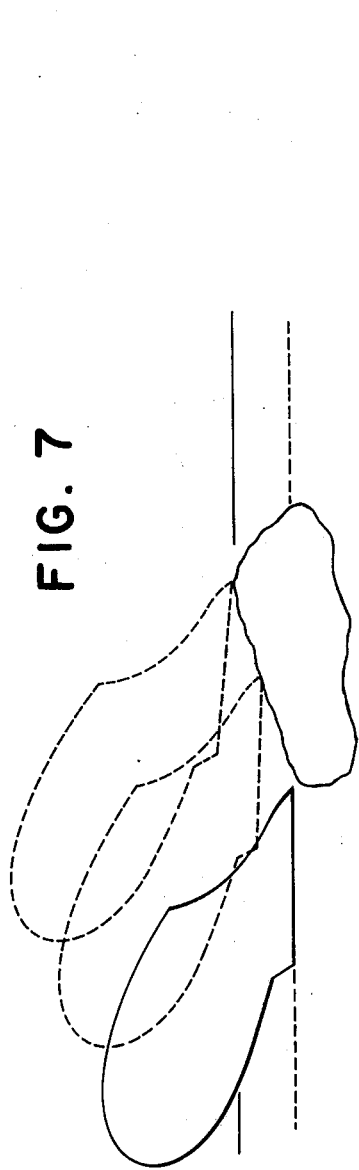
FIG. 7 shows the plow bottom as it would float and move over a surface obstacle, the obstacle not being of the type which would cause a complete tripping of the supporting mechanism.

Joining the linkage with the springs 18 is a lever 20. The lever 20 is pivotally coupled by pin 21 to the four bar linkage and by pin 22 to plates, shown only in dotted representation in FIG. 2, welded to the can between the springs 18. Accordingly, as the plow and consequently the four bar linkage are raised, the pin 22 is moved away from the frame member 10 and the can is shifted along the rods 16 and 17 thereby compressing the springs 18 that are mounted under compression between the flat washers 19 and the plate member 42. The springs 18 would thereby urge the four bar linkage towards its working position. This arrangement permits the linkage and plow to "float" or vertically move between the positions illustrated by the line AB of the envelope ABCD of FIG. 1 during operation. Upon encountering dome-like rocks or abnormal draft conditions, the linkage will raise yet be yieldably urged towards its lowered position. As is evident from FIGS. 1 and 7, the angle of attack of the plow point changes little as it floats.

The biasing means further acts through the lever 20 to maintain the plow in its ground penetrating configuration, yet to yieldably resist rotational movement of the plow away therefrom and to urge the plow towards its ground penetrating configuration after it has been tripped or rotated.

Figure 3:
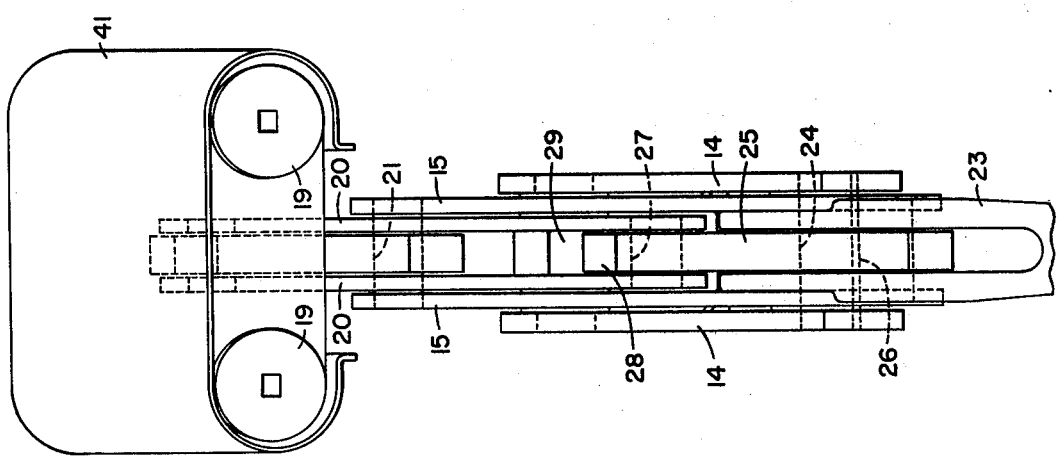
FIG. 3 is an enlarged rear view of the suspension mechanism.

To maintain the plow in its operating configuration yet permit vertical movement of the linkage, a further coupling between the lever means and plow is provided. This coupling permits rotational movement of the plow as excessive draft forces are encountered, but prevents rotation otherwise. Included in this coupling is a second lever 30 which is rigid with the plow standard 23. The standard 23 and lever portion 30 are rotatably coupled by pin 26 to the lower end of a toggle link 25. The standard 23 and its lever portion 30 also are pivotally connected at 24 to the lower end of link 15 and the rear end of link 14. The coupling further includes a toggle linkage composed of an extension of the first lever 20 and the link 25 and having a toggle joint or pivot 27 therebetween. It should be noted at this point that while each of these links and levers are referred to as singular members, that the preferred embodiment (see FIG. 3) actually often utilizes two parallel or identical members to form the respective link or lever in order to provide a more dependable structure. Collectively the links 20, 25, the upper portion 30 of the plow standard and the coupler link 15 of the first four bar linkage form a second four bar linkage that yields to permit the plow standard 23 to swing about pivot 24. The lower toggle link 25 includes an abutment surface 28 engageable with a toggle stop 29 carried by the upper link or lever 20. As is clearly apparent in FIG. 1, the springs 18 normally hold the surface stop 29 against abutment 28. In the normal plowing operation, this toggle joint will be uncollapsed. The draft forces encountered by the plow will act through lower toggle link 25 to create a counterclockwise moment about pin 21. Offsetting this moment about pin 21 will be a clockwise moment generated by the biasing means 18 urging the lever 20 clockwise. As extremely large draft forces acting on the plow occurs, as for example would occur when the plow bottom snags under a stone, the counterclockwise moment will be increased until it exceeds the clockwise moment of the spring and the toggle joint will then collapse (see FIG. 4), permitting the plow to rotate about its pivotal connection 24 with the linkage 10, 13, 14 and 15.

The present invention provides through its toggle linkage for the forces that are encountered by the plow bottom to be transmitted along a line indicated at $F_1$ (FIG. 1) which passes closely adjacent the axis of pin 21 and consequently has a short moment arm $A_1$. The spring biasing means having a force $F_2$ and countering the force $F_1$ acts through the much longer moment arm $A_2$ to oppose those forces.

When the plow operates at working depth, major changes in draft forces will cause the plow to "float" within the vertical range defined by points A and B on the envelope illustrated in FIG. 1. These draft forces are for the most part horizontal and are opposed by the biasing means acting through the toggle links to prevent rotation of the plow. Since these draft forces are normally well below that threshhold value required to collapse the toggle links and rotate the plow, only minor "floating" action of the first four bar linkage 10, 13, 14 and 15 occurs. By virtue of its structural configuration, the four bar linkage permits essentially vertical movement of the plow, but with little horizontal movement. Thus, the biasing force opposing vertical movement of the linkage can sufficiently be met by the spring means employed. Occasionally, minor obstacles will be encountered similar to those illustrated in FIG. 7. To clear these obstacles, the plow need not necessarily be rotated or tripped, but can simply float with the linkage up and over them with no interruption in plowing.

Figure 8:
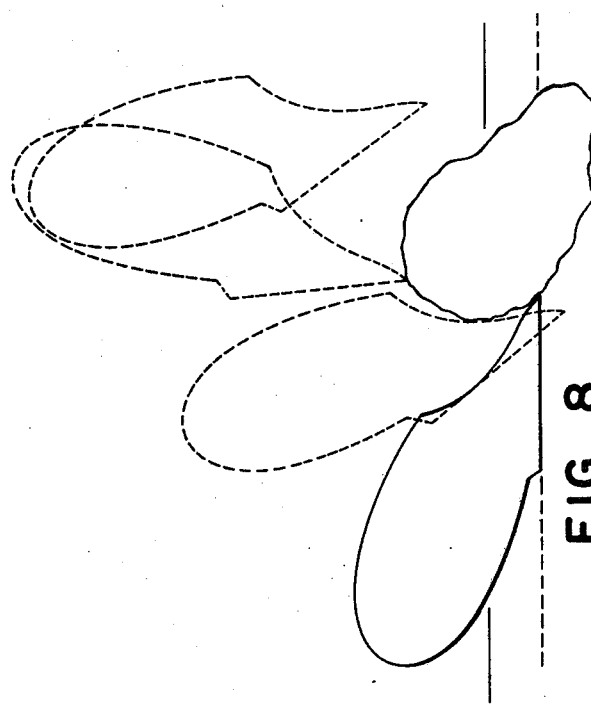
FIG. 8 shows a plow bottom as it trips and moves over an obstacle.

Infrequently, however, significant obstacles are encountered which can severely damage or ruin a plow. One example would be the ledge-type rocks prevalent in eastern Pennsylvania and as shown in FIG. 8. With the present device, the plow will release from even this type of obstruction as the plow rotates and raises to unhook the point (see FIGS. 4–6). As this type of obstacle is encountered, the present plow point will become hooked beneath the rock and then begin to rotate (see FIG. 4) as the forces cause the toggle joint to collapse. To clear the rocks, the bottom can rotate so that the point follows a path above or on curve AD shown in FIG. 1. As the plow continues to advance, the bottom rotation about pin 24 will stop as the forward end or edge 35 of the lever portion 30 of the standard 23 abuts a stop 36 carried by the lower link 14. At this point, the standard becomes rigid with link 14 and rotation of the bottom is about point 12. Rotation of the plow now is about a longer radius and movement of the plow is more nearly upwardly as the linkage is forced towards a raised position. This can clearly be seen by comparing the plow positions in FIGS. 4 and 5 and the portion DEC of the envelope in FIG. 1.

Figure 5:
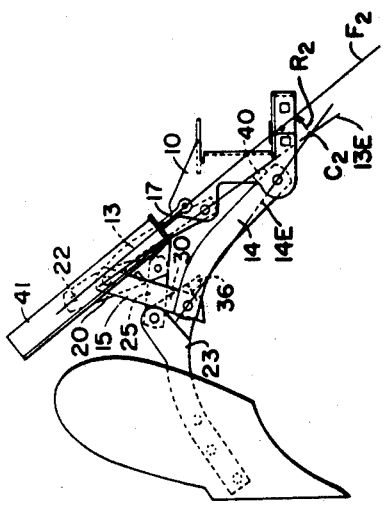
Figure 4:
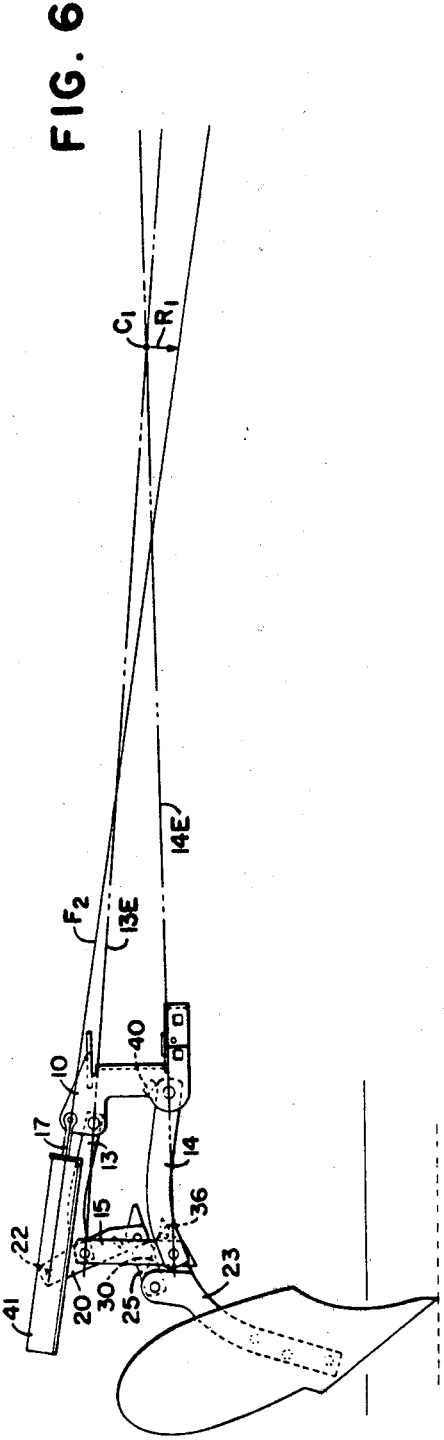

Reviewing FIGS. 4 and 5, it is clear that extensions 13E, 14E of the links 13, 14 converge toward one another and toward convergence points $C_1$ and $C_2$ respectively, forwardly of the frame portion 10. Referring first to FIG. 4, it becomes apparent that the force $F_2$ created by springs 18 passes beneath the point of convergence of the links 13, 14 by a distance $R_1$. Referring then to FIG. 5, it becomes apparent that the force $F_2$ created by the springs 18 passes forwardly of the point of convergence of the links 13, 14 by a distance $R_2$. Therefore, after the point crosses into the area EGC, some lift is provided to the bottom and linkage by the springs since the line of force created by the springs passes from beneath the convergence point of links 13 and 14 to above that point. In this way the resultant moment acting on the plow linkage changes from a counter-clockwise moment urging the plow linkage downward to a clockwise movement urging the linkage and bottom upward. The four bar linkage 10, 13, 14, 15, therefore, is utilized to continuously reposition the convergence point of the link extensions 13E, 14E in a manner that the spring force can best be utilized to position the plow as well as counteract the draft loads of the ground or buried objects against the plow bottoms.

Figure 6:
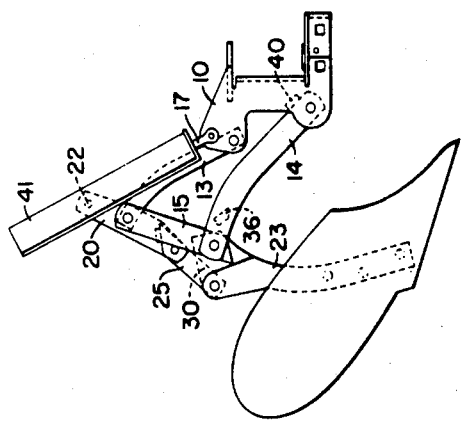
FIGS. 4, 5 and 6 are side views showing the plow bottom as it would move when the point of the plow bottom moves from under an obstruction and also showing the action of the tripping mechanism as the plow bottom trips and then resets prior to reentry into the ground.

As the plow bottom clears the obstacle, the biasing means will act on lever 20 to reset the toggle linkage and hence the plow bottom as illustrated in FIG. 6. In this illustrated position, the four bar linkage 10, 13, 14 and 15 is in its fully lifted position and the link 14 is up against a stop 40 provided on the frame. As the springs 18 extend to reset the toggle links 20 and 25, edge 28 will come into contact with stop 29 to reposition the plow to its proper angle of attack. The springs 18 are then in a position to urge the plow back into ground contact which, aided by the gravitation force on the plow, makes for a fast return to plowing position.

While any particular dimensioning of the mounting structure can be adapted, the preferred embodiment has been provided with dimensions which permit the plow bottom to clear normal obstacles in a field. Movement of the plow point A as it floats or rotates over an obstacle can follow any path on or within the envelope illustrated in FIG. 1. Minor changes to that envelope can be made by adjusting the structural dimensions as desired without departing from the advantages provided by the present invention.

We claim:

1. In an earthworking implement of the type having a supporting frame and an earthworking tool carried by the frame, the improvement comprising means for mounting the tool on the frame for reciprocable and rotational movement within a vertical plane including: a fore-and-aft extending vertically disposed four bar linkage having four rigid pivotally connected links, one of which is a forward vertically disposed link rigid with the frame, said linkage being reciprocable between a first lowered and second elevated position; a rigid tool support; means on the tool support for pivotally depending the tool support from said linkage for rotational movement between a forward and a rear position; biasing means pivotally carried by the four bar linkage for swinging movement in a vertical plane; lever means pivotally mounted on the four bar linkage for relative rotation thereto connecting the biasing means with said linkage for urging the latter towards its first position; first connecting means on the tool support offset from the means pivotally depending said tool support from the linkage; and second means connecting said lever means with the first connecting means interconnecting the biasing means to the first connecting means so as to yieldably resist rotation of the tool from its forward position and to return said tool to its forward position after movement therefrom.

2. The invention defined in claim 1 wherein the biasing means includes a spring member pivotally supported by the link of the four bar linkage that is rigid with the frame, said spring member carried above said linkage and coupled therewith.

3. The invention defined in claim 1 wherein the biasing means includes a spring carried by a swingable rod and compressible between one stop fixed to said rod and a second stop coupled with said lever means and slidable on said rod as said rod is swingably moved between a raised and lowered position.

4. The invention defined in claim 1 wherein second means connecting said lever means is a toggle means including a first and second link pivotally joined and having a collapsible toggle joint therebetween, said first link pivotally joined with the first connecting means and said second link with the lever means.

5. The invention defined in claim 4 wherein the lower link and the upper link converge toward one another and the biasing means is arranged such that the lines of force exerted by said biasing means moves in a vertical plane and passes to opposite sides of the imaginary convergent point of the links upon the toggle means moving between collapsed and extended positions whereby said biasing means acts to urge said linkage towards each of its said positions.

6. The invention defined in claim 1 wherein there is further provided means for limiting the vertical movement of said linkage.

7. The invention defined in claim 1 wherein stop means are provided between the tool and linkage to limit rotational movement of said tool about its pivotal connection with the linkage.

8. The invention defined in claim 1 wherein the second means connecting the first connecting means with the lever means includes an upper and lower rigid link having a toggle joint therebetween, the lower link pivotally coupled with the first connecting means and the upper link pivotally supported by said four bar linkage and coupled with said biasing means, said biasing means yieldably urging said joint towards an uncollapsed position whereat said tool is in its first position.

9. The invention defined in claim 8 wherein the upper link is rigid with the lever means and is coupled with said biasing means through said lever means.

10. The invention defined in claim 1 wherein the second means connecting said first connecting means and lever means includes lower and upper links pivotally joined together and having a toggle joint therebetween, the lower link pivotally coupled with the first connecting means, the upper link pivotally carried by the four bar linkage and coupled with said biasing means to be yieldably urged towards a first position whereat said toggle joint is uncollapsed and said tool is in its forward position.

11. In an earthworking implement, the combination of a supporting frame, an earthworking tool, a four bar linkage carried by the frame and reciprocable between a first lowered and second elevated position, said four bar linkage being composed of an upright link rigid with said frame, upper and lower rigid links swingable vertically from forward ends pivotally connected to the upright link and extending therefrom to upper and lower pivot connections to a coupler link, pivotal means connecting said tool with said linkage rearwardly of the upright link for rotational movement between first forward and second rearward positions, and means carried by the frame for urging said linkage and said tool towards their respective first positions, yet adapted to yieldably resist rotation of the tool or reciprocable movement of said linkage including biasing means swingably carried by the linkage, lever means carried by the linkage for pivotal movement relative thereto and coupled with said biasing means to yieldably urge said linkage towards its first position, an extension rigid with the tool having connecting means offset from the pivotal means, and force-transmitting means between the lever means and connecting means yieldably urged by said biasing means towards a position whereat the tool is in its forward position, and shiftable to a position upon said tool encountering abnormal draft forces whereby said tool is rotated towards its rearward position.

12. The invention defined in claim 11 wherein the force-transmitting means is a toggle means including an upper and lower toggle link having a toggle joint therebetween and said lower link is pivotally coupled with the connecting means and said other link is rigid with the lever to rock therewith.

13. The invention defined in claim 12 wherein the means coupled with the tool is a rigid link and together with said toggle links and one link of said four bar linkage comprise a second four bar linkage carried by the first four bar linkage.

14. The invention defined in claim 12 wherein the lever is rigid with the upper toggle link for rotational movement therewith.

15. In an earthworking implement of the type having a supporting frame and an earthworking tool carried by the frame, the improvement comprising means for mounting the tool on the frame for reciprocable and rotational movement within a vertical plane including: a first four bar linkage carried by the frame and reciprocable between a first lowered and second elevated position, said linkage being composed of an upright link rigid with said frame, upper and lower rigid links swingable vertically from forward ends pivotally connected to the upright link and extending therefrom to upper and lower pivot connections to a coupler link; means pivotally depending said tool from the linkage for rotational movement between a first forward and second rearward position; biasing means pivotally carried by the first four bar linkage frame for swinging movement within a vertical plane; and a second four bar linkage carried by the first linkage, said second linkage operatively coupling the biasing means with said tool and first linkage to yieldably resist movement of said tool and first linkage from their respective first positions, and to urge said tool and first linkage towards their respective first positions upon movement away therefrom.

16. The invention defined in claim 15 wherein two opposite links of said first four bar linkage are of approximate equal length.

17. The invention defined in claim 15 wherein the first and second four bar linkage include a common link, said common link being the coupler link of said first four bar linkage.

18. The invention defined in claim 15 wherein the second four bar linkage includes a rigid link and coupled to rotate with said tool, and a toggle means include upper and lower toggle links having a toggle joint therebetween, said lower link pivotally coupled with said rigid link and said upper link pivotally carried by said first linkage and operatively connected with said biasing means whereby said toggle joint is movable between collapsed and uncollapsed positions and when in a first uncollapsed position does urge said tool and first linkage towards their respective first positions and when in a second uncollapsed position does yieldably permit rotational movement of said tool towards its second rearward position.

19. The invention defined in claim 18 wherein there is further provided stop means for limiting rotational movement of said tool about its pivotal support means.

20. In an earthworking implement of the type having a supporting frame and an earthworking tool carried by the frame, the improvement comprising means for mounting the tool on the frame for reciprocable and rotational movement within a vertical plane including: a four bar linkage carried by the frame and reciprocable between a first lowered and second elevated position, one link thereof vertically disposed and rigid with said frame; means pivotally depending the tool from said linkage for rotational movement between a first lowered forward and second elevated rearward position; spring biasing means pivotally carried by the four bar linkage for swinging movement in a vertical plane; a first lever connecting the biasing means with the linkage for urging the latter towards its first position; a second lever coupled with the tool to rotate therewith; and a toggle means including an upper and lower toggle link having a toggle joint therebetween, the lower link pivotally connected with said second lever, the upper link coupled with said first lever to rotate therewith, with said toggle means being movable between a first uncollapsed position in which said tool is in its forward position and a second collapsed position in which said tool is in said rearward position, and when in its uncollapsed position acts to yieldably hold the tool in its forward position and when in its collapsed position urges said tool to return to its forward position.

21. The invention defined in claim 20 wherein the second lever is pivotally carried by the first four bar linkage and together with the two toggle links and one link of the first four bar linkage form a second four bar linkage carried by said first four bar linkage.

22. A suspension and reset means for a plow carried on a frame comprising: a fore-and-aft extending vertically disposed four bar linkage composed of a first upright link fixed against movement, upper and lower rigid links swingable vertically from forward ends pivotally connected to the upright link and extending therefrom to upper and lower pivot connections at opposite ends of a coupler link said linkage being swingable vertically on said first link between upper and lower positions; a plow standard pivotally connected to said linkage adjacent said lower pivot connection; means limiting movement of said plow standard between forwardmost and rearwardmost positions with respect to said linkage means; compressible link means extending between the plow standard and four bar linkage the pivotal connection of the compressible link means to the standard being radially offset from the standard's pivotal connection to the four bar linkage, said compressible link means normally holding said plow standard in its forwardmost position but yieldable to permit said standard to shift to its rearwardmost position, and said four bar linkage being biased against shifting vertically from its lower position.

23. A spring suspension and reset means for a plow carried on a frame comprising: a fore-and-aft vertically disposed extending four bar linkage composed of a first upright link rigid with the frame, upper and lower swingable vertically from forward ends connected to the upright link and extending therefrom to upper and lower pivot connections at opposite ends of a coupler link; a plow standard coupled to said linkage at said lower pivot connection; a lever rockable on said upper pivot connection and having upper and lower portions extending above and below the pivot; a connecting link pivotally connected at one portion to said standard on a pivot rearwardly spaced from said lower pivot connection and at the other end portion to the lower portion of said lever; a first abutment means between the lever and connecting link limiting rearward movement of the connecting link to a rearwardmost position in which the pivotal connection between the lever and link is overcenter forwardly with respect to a line between said upper pivotal connection and the pivotal connection between the link and said plow standard; a second abutment means on said four bar linkage limiting rearward swinging of said plow standard about said lower pivotal connection; and spring means carried by the frame and connected to the upper portion of said lever for yieldably holding said connecting link in said rearwardmost position.

24. The invention defined in claim 23 in which a line passing through the connecting link pivotal connections to the lever and standard when said connecting link is in said rearwardmost position would pass forwardly of but closely adjacent to the upper pivotal connection and whereby as said connecting link swings forwardly about its connection to the standard, the line would move forwardly with respect to the upper pivot connection.

25. The invention defined in claim 23 in which the first abutment means is a stop on the lever that contacts an edge of the connecting link, and said spring means is sufficiently strong to cause said edge to remain in contact with said stop unless an abnormally strong rearward force is applied to a plow on the standard.

26. In an earth-working implement of the type having a supporting frame and an earth-working tool carried by the frame, the improvement comprising means for mounting the tool on the frame for reciprocable and rotational movement within a vertical plane including: a fore-and-aft extending vertically disposed four-bar linkage having four pivotally connected rigid links one of which is a forward vertically disposed link rigid with the frame, said linkage being reciprocable between a first lowered and second elevated position; means pivotally depending said tool from said linkage for swinging movement between a forward and rear position; first lever means pivotally carried by said linkage; biasing means pivotally supported by the frame and coupled with the first lever means to swingably urge the latter about its pivotal support; a member rigid with the tool extending laterally of the means pivotally depending the tool from the linkage; and force transmitting means coupled with the lever means and member for swingably shifting said member and tool about the means pivotally depending said tool upon swinging movement of the first lever means.

27. The invention defined in claim 26 wherein the force transmitting means forms with the first lever means a toggle linkage, collapsable upon the tool encountering an abnormal draft load.

28. The invention defined in claim 26 wherein swingable movement of the member is limited by a stop means engaged by the linkage.

29. A suspension and reset means for a plow comprising: a fore-and-aft extending and vertically disposed four bar linkage composed of a first upright link fixed against movement, upper and lower rigid links swingable vertically from forward ends pivotally connected to the upright link and extending therefrom to upper and lower pivot connections at opposite ends of a coupler link; a plow standard pivotally coupled to said linkage so as to raise and lower with the linkage and to rock fore-and-aft on the linkage; a lever rockable fore-and-aft on said linkage; means connected to said standard on a pivot spaced from the coupling connection of said standard to said linkage and for connecting said standard to said lever; means limiting movement of the linkage to a lowermost position and the plow standard to a forwardmost position; and biasing means connected to said lever for yieldably holding said linkage in its lowermost position and the plow standard in its forwardmost position.

30. The invention described in claim 29 in which the means connected to said standard is a link having one end carried on the pivot spaced from the pivot connection of said standard and the other end pivotally connected to the lever and further characterized by said means limiting movement being at least in part an abutment between the lever and link that is engageable upon the plow standard being in its forwardmost position.

31. The invention described in claim 29 in which the lever is carried on the four bar linkage adjacent said upper pivot connection at the upper end of the coupler link, the plow standard is pivotally coupled to the four bar linkage adjacent said lower pivot connection and the means connected to said standard is a link having one end carried on the pivot spaced from the pivot connection and the other end pivotally connected to the lever.

32. The invention described in claim 29 further characterized by said means limiting movement being abutment means engageable with the lever and links of said linkage to limit downward movement of the linkage to its lowermoset position and said plow standard to its forwardmost position and in which said biasing means yieldably hold the lever and links in engagement with the abutment means.

33. A suspension and reset means for a plow comprising: a fore-and-aft extending and vertically disposed first four bar linkage composed of a first upright link fixed against movement, upper and lower rigid links swingable vertically from forward ends pivotally connected to the upright link and extending therefrom to upper and lower pivot connections at opposite ends of a coupler link; a plow standard pivotally coupled to said linkage adjacent said lower pivot connection so as to raise and lower with the linkage and to rock fore-and-aft on the linkage; a pair of links having adjoining ends and respective opposite ends pivotally connected to the linkage adjacent the upper pivotal connection and to said standard at a location spaced from the coupling connection of said standard to said linkage, said pair of links and plow standard portion between said location and coupling connection thereby forming with the aforesaid coupler link a second four bar linkage; abutment means between links of the four bar linkages limiting downward movement of said first linkage to a lowermost position and said plow standard to a forwardmost position; and biasing means connected to said linkages for yieldably holding said first linkage in its lowermost position and the plow standard in its forwardmost position.

34. A suspension and reset means for a plow comprising: a fore-and-aft extending and vertically disposed four bar linkage composed of a first upright link fixed against movement, upper and lower rigid links swingable vertically from forward ends pivotally connected to the upright link and extending therefrom to upper and lower pivot connections at opposite ends of a coupler link; a plow standard pivotally coupled to said linkage adjacent said lower pivot connection so as to raise and lower with the linkage and to rock fore-and-aft on the linkage; means limiting downward movement of said linkage to a lowermost position and said plow standard to a forwardmost position; and compressible link means including biasing means pivotally connected to said linkage and said standard at a location thereon spaced from the pivot coupling of said standard to said linkage, the biasing means imparting forces on said linkage and plow standard for yieldably holding said linkage in its lowermost position and the plow standard in its forwardmost position.

35. A suspension and reset means of a plow comprising: a fore-and-aft extending and vertically disposed four bar linkage composed of a first upright link fixed against movement, upper and lower rigid links swingable vertically from forward ends pivotally connected to the upright link and extending therefrom to upper and lower pivot connections at opposite ends of a coupler link; a plow standard pivotally coupled to said linkage adjacent said lower pivot connection so as to raise and lower with the linkage and to rock fore-and-aft on the linkage; means limiting downward movement of said linkage to a lowermost position and said plow standard to a forwardmost position; and compressible link means including biasing means pivotally connected to said linkage adjacent the upper pivot connection and said standard at a location thereon spaced from the pivot coupling of said standard to said linkage, the biasing means imparting forces on said linkage and said compressible link means for yieldably holding said linkage in its lowermost position and the plow standard in a forwardmost position.

36. The invention described in claim 35 in which said location on the plow standard is rearwardly of the coupler link and said compressible link means is generally rearwardly of the coupler link.

37. The invention described in claim 35 in which the compressible link means is a toggle linkage with one link thereof being connected to said linkage and the other being connected to said plow standard and the biasing means is connected to at least one of the links so as to extend the toggle linkage for yieldably maintaining the plow standard in its forwardmost position.

38. The invention described in claim 37 further characterized by abutment means between the links of the toggle linkage that limits forward movement of said plow standard to its forwardmost position.

39. The invention described in claim 38 in which the biasing means is a spring connected directly to one of said links of the toggle linkage and for yieldably resisting collapse of the toggle linkage.

40. A suspension and reset means for a plow comprising: a fore-and-aft extending and vertically disposed four bar linkage composed of a first upright link fixed against movement, upper and lower rigid links swingable vertically from forward ends pivotally connected to the upright link and extending therefrom to upper and lower pivot connections at opposite ends of a coupler link; a plow standard pivotally coupled to said linkage adjacent the lower pivot connection so as to raise and lower with the linkage and to rock fore-and-aft on the linkage; a lever rockable fore-and-aft on said linkage and mounted thereon adjacent the upper pivot connection; a link connected to said standard on a pivot spaced from the coupling connection of said standard to said linkage and connecting said standard to said lever; abutment means between links of the four bar linkage for limiting downward movement of said linkage to a lowermost position and between the lever and link connecting the lever to the plow standard for limiting movement of said plow standard to a forwardmost position; and biasing means connected to said lever and said linkage for yieldably holding said linkage in its lowermost position and the plow standard in its forwardmost position.

41. A suspension and reset means for a plow comprising: a fore-and-aft extending and vertically disposed first four bar linkage composed of a first upright link fixed against movement, upper and lower rigid links swingable vertically from forward ends pivotally connected to the upright link and extending therefrom to upper and lower pivot connections at opposite ends of a coupler link; a plow standard pivotally coupled to said linkage adjacent said lower pivot connection so as to raise and lower with the linkage and to rock fore-and-aft on the linkage; a pair of links having adjoining ends and respective opposite ends pivotally connected to the linkage adjacent the upper pivotal connection and to said standard at a location spaced from the coupling connection of said standard to said linkage, said pair of links and plow standard portion between said location and coupling connection thereby forming with the aforesaid coupler link a second four bar linkage; abutment means between links of the four bar linkages limiting downward and upward movement of said first linkage to lowermost and uppermost positions and said plow standard to forwardmost and rearmost positions; and biasing means connected to said linkages for yieldably holding said first linkage in its lowermost position and the plow standard in its forwardmost position.

42. A suspension and reset means for a plow comprising: a fore-and-aft vertically disposed extending four bar linkage composed of a first upright link fixed against movement, upper and lower rigid links swingable vertically from forward ends pivotally connected to the upright link and extending therefrom to upper and lower pivot connections at opposite ends of a coupler link, said linkage being swingable vertically on said first link between upper and lower positions; a plow standard coupled to said linkage adjacent said lower pivot connection; a lever rockable on said linkage adjacent said upper pivot connection and having upper and lower portions extending above and below the pivot; a connecting link pivotally connected at one portion to said standard on a pivot rearwardly spaced from said lower pivot connection and at another portion to the lower portion of said lever; a first abutment means between the lever and connecting link limiting rearward movement of the connecting link to a rearwardmost position in which the pivotal connection between the lever and link is overcenter forwardly with respect to a line between said upper pivotal connection and the pivotal connection between the link and said plow standard; a second abutment means on said four bar linkage limiting rearward swinging of said plow standard about said lower pivotal connection; and spring means connected to the upper portion of said lever for yieldably holding said connecting link in said rearwardmost position.

* * * * *

UNITED STATES PATENT OFFICE
CERTIFICATE OF CORRECTION

Patent No. 4,128,130  Dated 5 December 1978

Inventor(s) Robert V. Green, Jack C. Wiley and Loren G. Arnold

It is certified that error appears in the above-identified patent and that said Letters Patent are hereby corrected as shown below:

Column 8, line 65, after "fore-and-aft" insert -- extending --.

Column 8, line 66, delete "extending".

Column 9, line 6, after "the" insert -- upper --; same line, after "pivot" insert -- connection --.

Signed and Sealed this

Eighth Day of July 1980

[SEAL]

Attest:

SIDNEY A. DIAMOND

Attesting Officer  Commissioner of Patents and Trademarks